United States Patent [19]
Borrman et al.

[11] Patent Number: 5,124,112
[45] Date of Patent: Jun. 23, 1992

[54] SEALING DEVICE IN A NUCLEAR REACTOR

[75] Inventors: Bo Borrman; Börje Larsson; Hans Kornfeldt; Lars-Åke Körnvik; Lars Törnblom, all of Västerås, Sweden

[73] Assignee: ABB Atom AB, Västerås, Sweden

[21] Appl. No.: 645,500

[22] Filed: Jan. 24, 1991

[30] Foreign Application Priority Data

Jan. 29, 1990 [SE] Sweden .................. 9000307-0

[51] Int. Cl.$^5$ .............................................. G21C 13/00
[52] U.S. Cl. ........................................ 376/203; 285/302
[58] Field of Search ................ 376/203, 204, 286; 285/268, 302, 335, 158; 976/DIG. 171, 176, 173

[56] References Cited

U.S. PATENT DOCUMENTS

| | | | |
|---|---|---|---|
| 4,807,262 | 2/1989 | Shields | 376/203 |
| 4,826,217 | 5/1989 | Guerrero | 285/185 |
| 4,981,311 | 1/1991 | Kinney | 285/302 |
| 5,006,300 | 4/1991 | Jonsson et al. | 376/302 |

Primary Examiner—Brooks H. Hunt
Assistant Examiner—Frederick H. Voss
Attorney, Agent, or Firm—Watson, Cole, Grindle & Watson

[57] ABSTRACT

The invention relates to a sealing joint for pipes (3) or pipe sockets (2) in, for example, a nuclear reactor. The joint comprises at least two sealing bodies (4, 5) contacting each other in a contact surface (8) and provided with through holes (6, 7). The holes (6, 7) are delimited by envelope surfaces (9, 10) and form a tubular channel (11) through the sealing bodies (4, 5) and the contact surface (8). The sealing bodies (4, 5) are displaceable in relation to each other along the contact surface (8). Around the channel (11) a sealing member (12) is arranged between the sealing bodies (4, 5). Each one of the sealing bodies (4, 5) is divided into at least two discs (4a, 4b; 5a, 5b, respectively) in a plane intersercting the associated envelope surface (9,10) along a closed curve. Between the discs belonging to a sealing body (4, 5), a slot (13) has been provided which is delimited by the associated envelope surface (9, 10). A flexible sealing ring (13a) is inserted into the slot (13). When the discs are compressed, the volume of the slot (13) is adapted to be reduced, causing the inserted sealing ring to be partially pressed out of the slot and towards, for example, a pipe (3) located in the channel (11).

11 Claims, 1 Drawing Sheet

SEALING DEVICE IN A NUCLEAR REACTOR

FIELD OF THE INVENTION

The present invention relates to a sealing joint which is especially suited for repairing leaks which are difficult to reach, for example, in a nuclear reactor.

BACKGROUND OF THE INVENTION

A nuclear reactor includes a plurality of pipes, pipe sockets and the like, in which cracks, especially in the vicinity of welds, may arise and in which, during repair, one end of the pipe may be released so as to form an open pipe end for fitting a suitable sealing sleeve thereon. In view of the radioactivity in a nuclear reactor, such a sealing sleeve must be capable of being operated at a large distance. The sealing joint according to the invention is especially designed to fulfil this requirement.

SUMMARY OF THE INVENTION

The sealing joint comprises at least two sealing bodies contacting each other in a contact surface and provided with through holes. The holes are delimited by an envelope surface in the sealing bodies and form a tubular channel through the sealing bodies and the contact surface therebetween. The invention is characterized in that the sealing bodies are displaceable in relation to each other along the contact surface and that sealing members are arranged around the channel between the sealing bodies. Each sealing body is divided into at least two discs in a plane intersecting the associated envelope surface along a closed curve, and between the discs a slot for a sealing ring is arranged in the envelope surface around the circumference of the hole. The volume of this slot is reduced when the discs, after the sealing joint has been applied around a pipe, are compressed to achieve sealing against the pipe. This causes the sealing ring to be partially pressed out of the slot and to be pressed with sealing force against the pipe.

BRIEF DESCRIPTION OF THE DRAWINGS

The invention will be most readily unserstood with reference to the accompanying FIGS. 1 and 2, wherein.

DETAILED DESCRIPTION OF THE INVENTION

Figure 1:
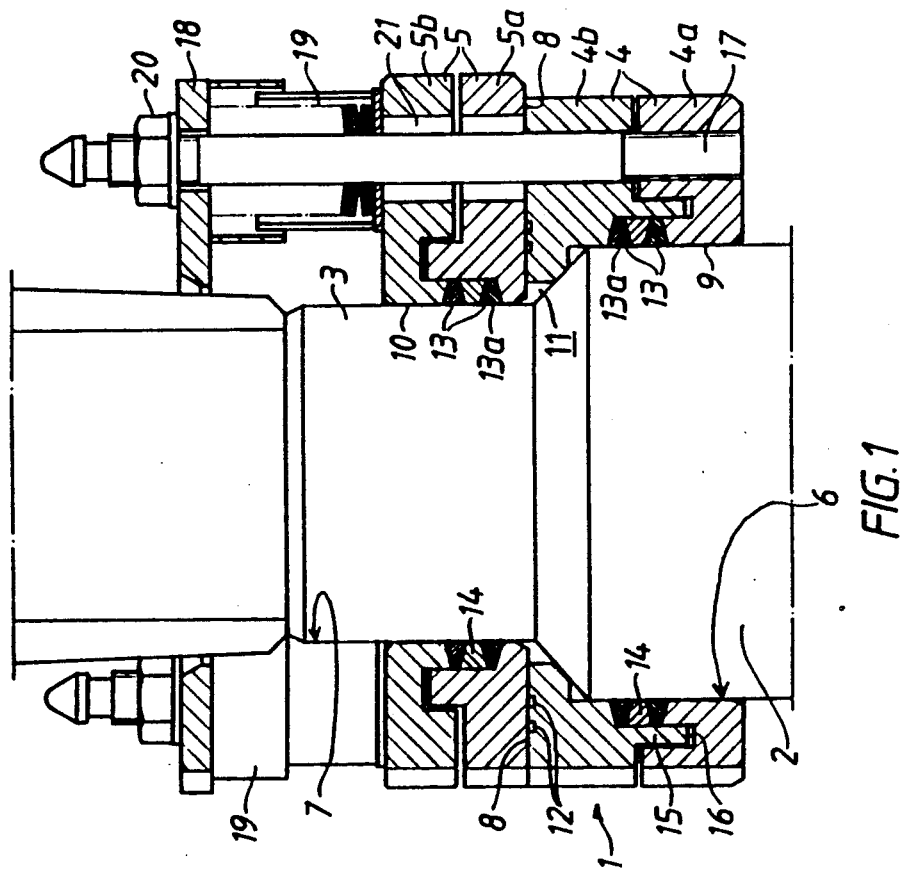
FIG. 1 shows a section I—I through FIG. 2.

In FIG. 1, 1 designates a sealing joint and 2 a pipe socket. A pipe 3 for the operating rod of a control rod is welded to the pipe socket 2. The sealing joint 1 is applied around this joint. The sealing joint 1 is composed of the sealing bodies 4 and 5 through which the holes 6 and 7 are provided. The sealing bodies 4, 5 make contact with each other in a contact surface 8 and are displaceable in relation to each other along this surface. The holes 6, 7 are delimited in the sealing bodies 4, 5 by envelope surfaces 9, 10 and together form a channel through the sealing bodies 4, 5 and the contact surface 8. Sealing members 12 are arranged between the sealing bodies 4, 5 in the contact surface 8 around the channel 11.

Each sealing body 4, 5 is divided into at least two discs 4a, 4b and 5a, 5b, respectively. Between two discs belonging to the same sealing body, one or more slots 13 are arranged, delimited by associated envelope surfaces 9, 10. In these slots 13 flexible sealing rings 13a have been located. The slots 13 may suitably have a cross section in the form of a triangle, as shown in the figure, with the base facing the envelope surface 9, 10. However, there may, of course, be other shapes of the slot 13, such as rectangular, parallel-trapezoidal, etc. The main thing is that the volume of the slot 13 is reduced when the discs 4a, 4b and 5a, 5b, respectively, are compressed, causing the sealing ring 13a to be partially pressed out of the slot 13. Several parallel sealing rings 13a may, as will also be clear from FIG. 1, be arranged between two discs. However, in that case a movable intermediate ring 14 must be placed between the sealing rings 13a.

The discs 4a, 4b and 5a, 5b are guided in relation to each other by the elevations 15 in one of the discs and the recesses 16 in the other disc.

In this case the sealing bodies 4, 5 are retained by bolts 17. However, other means may, of course, also be used, such as an external sleeve surrounding the sealing bodies. The bolts 17 are threaded in the outer disc 4a and run through a hole 21, which is enlarged in relation to the bolt diameter, in the sealing body 5. The bolts 17 are passed through a plate 18. Between this plate 18 and the sealing body 5, springs 19 are provided, in this case around the bolts. The nuts 20 are accessible to a remote-controlled special tool.

Figure 2:
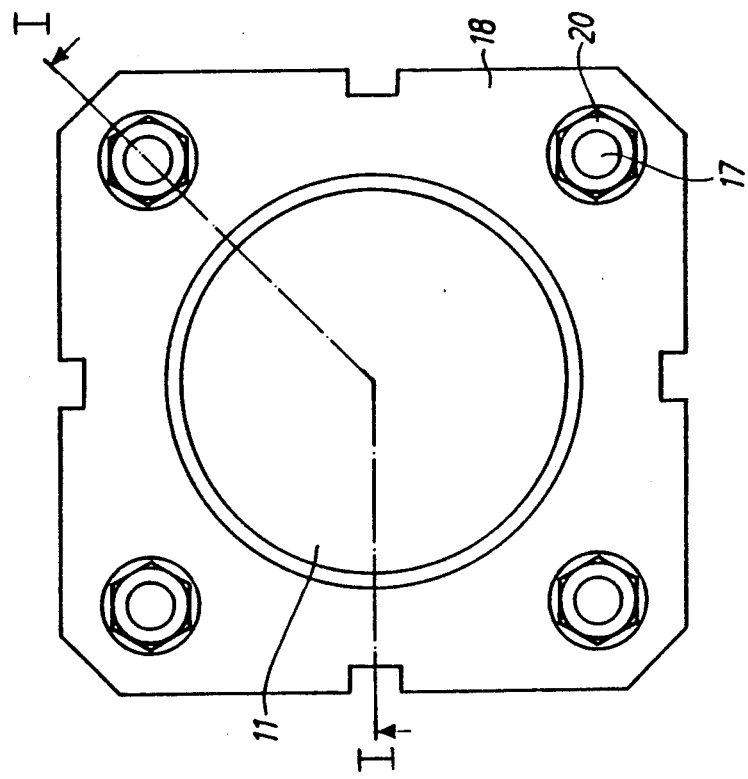
FIG. 2 shows the sealing joint seen from above.

In FIG. 2 the same designations as in FIG. 1 have been inserted.

When a leak is to be sealed, the sealing joint is applied over the pipe socket 2 and the pipe 3. If these are eccentric in relation to each other, this can be handled by the sealing body 5 being laterally displaceable in relation to the sealing body 4, in which case the holes 6, 7 are also displaced in relation to each other. The displacement takes place along the contact surface 8 and is made possible by the bolt holes 21 in the sealing body 5 having a considerably larger diameter than the bolts 17.

When the sealing joint is in position, the nuts 20 are tightened, causing the sealing rings 13a to be partially pressed out of the slot 13 in a direction towards the pipe 3 and the pipe socket 2, and the sealing members 12 start operating and achieve sealing between the sealing bodies. The region in the channel 11 between the sealing rings 13a thus becomes completely sealed.

We claim:

1. A sealing joint for sealing a possible leak in a pipe or a pipe socket in a nuclear reactor, comprising at least two sealing bodies contacting each other at contact surfaces and provided with through holes, said holes being delimited by envelope surfaces and forming a tubular channel through the sealing bodies and the contact surfaces wherein the sealing joint may be fitted over said possible leak in said pipe or pipe socket by introducing said pipe or pipe socket in said tubular channel, the sealing bodies being displaceable in relation to each other along the contact surfaces, around the channel sealing members are arranged between the sealing bodies, each one of said sealing bodies being divided into at least two discs in a plane intersecting the associated envelope surface along a closed curve, a slot arranged on each side of said possible leak between the discs and delimited by the envelope surface around the circumference of the holes, and a sealing ring in said slot, the volume of said slot being reduced when the discs are pressed against each other by continuous spring-loaded bolts, each bolt running through a hole in one of the sealing bodies, said hole having a diameter which is larger than a diameter of the bolt such that lateral displacement of the sealing bodies in relation to each other is permitted, the sealing rings thus being pressed out of said slots and against the pipe or pipe socket creating a seal between the sealing joint and said pipe or pipe socket on each side of said possible leak.

2. A sealing joint according to claim 1, wherein the discs are guided in relation to each other by means of elevations arranged in one of the discs and corresponding recesses in the other disc.

3. A sealing joint according to claim 1, wherein the sealing ring is flexible and consists of graphite.

4. A sealing joint according to claim 1, wherein the holes in the sealing bodies have different diameters.

5. A sealing joint according to claim 1, wherein two or more parallel slots are arranged between each pair of discs, the slots being delimited with respect to each other by a movable intermediate ring arranged therebetween.

6. A sealing joint for sealing a possible leak in a pipe or a pipe socket in a nuclear reactor, comprising at least two sealing bodies contacting each other at contact surfaces and provided with through holes, said holes being delimited by envelope surfaces and forming a tubular channel through the sealing bodies and the contact surfaces wherein the sealing joint may be fitted over said possible leak in said pipe or pipe socket by introducing said pipe or pipe socket in said tubular channel, the sealing bodies being laterally displaceable in relation to each other along the contact surfaces, around the channel sealing members are arranged between the sealing bodies, each one of said sealing bodies being divided into at least two discs in a plane intersecting the associated envelope surface along a closed curve, a slot arranged on each side of said possible leak between the discs and delimited by the envelope surface around the circumference of the holes, continuous spring-loaded means for pressing the at least two discs of each sealing body against each other, and a sealing ring in said slot, the volume of said slot being reduced when the discs are pressed against each other, the sealing rings thus being pressed out of said slots and against the pipe or pipe socket creating a seal between the sealing joint and said pipe or pipe socket on each side of said possible leak.

7. A sealing joint according to claim 6, wherein the discs are guided in relation to each other by means of elevations arranged in one of the discs and corresponding recesses in the other disc.

8. A sealing joint according to claim 6, wherein the sealing bodies are compressed by continuous spring-loaded bolts, each bolt running through a hole, which is enlarged in relation to the diameter of the bolt, in one of the sealing bodies, said larger hole permitting lateral displacement of the sealing bodies in relation to each other.

9. A sealing joint according to claim 6, wherein the sealing ring is flexible and consists of graphite.

10. A sealing joint according to claim 6, wherein the holes in the sealing bodies have different diameters.

11. A sealing joint according to claim 6, wherein two or more parallel slots are arranged between each pair of discs, the slots being delimited with respect to each other by a movable intermediate ring arranged therebetween.

* * * * *